United States Patent [19]

Wolpaw et al.

[11] Patent Number: 5,638,826
[45] Date of Patent: Jun. 17, 1997

[54] COMMUNICATION METHOD AND SYSTEM USING BRAIN WAVES FOR MULTIDIMENSIONAL CONTROL

[75] Inventors: Jonathan R. Wolpaw, Delmar; Dennis J. McFarland, Ravena, both of N.Y.

[73] Assignee: Health Research, Inc., Albany, N.Y.

[21] Appl. No.: 456,758

[22] Filed: Jun. 1, 1995

[51] Int. Cl.$^6$ .............................................. A61B 5/0476
[52] U.S. Cl. .................. 128/732; 340/825.19; 345/157; 463/36
[58] Field of Search ................... 128/731, 732; 273/438, 148 B; 340/825.19; 345/157; 341/20, 21

[56] References Cited

U.S. PATENT DOCUMENTS

| | | | |
|---|---|---|---|
| 4,013,068 | 3/1977 | Settle et al. | 128/732 |
| 4,158,196 | 6/1979 | Crawford, Jr. | 128/731 |
| 4,454,886 | 6/1984 | Lee | 128/732 |
| 4,651,145 | 3/1987 | Sutter | 340/825.19 |
| 4,800,893 | 1/1989 | Ross et al. | 128/732 |
| 4,883,067 | 11/1989 | Knispel et al. | 128/732 |
| 4,926,969 | 5/1990 | Wright et al. | 128/731 |
| 5,474,082 | 12/1995 | Junker | 128/732 |

FOREIGN PATENT DOCUMENTS

| | | | |
|---|---|---|---|
| 89/09019 | 10/1989 | WIPO | 128/731 |

OTHER PUBLICATIONS

Wolpaw et al., "An EEG-based brain–computer interface for cursor control," Electroencephalography and Clinical Neurophysiology, pp. 252–259. 1991.

*Primary Examiner*—Lee S. Cohen
*Assistant Examiner*—Eric F. Winakur
*Attorney, Agent, or Firm*—Salzman & Levy

[57] ABSTRACT

The invention contemplates that brain waves, preferably mu rhythm waves of an individual, can control a cursor on a video monitor or other device in the environment. Such communication via mu rhythms is optimized both in real time, and by stored data. The mu rhythms are detected, filtered, and amplified, as an individual sits facing a video, or other display screen. The scalp of the individual has electrodes placed in approximately 64 locations, for monitoring the mu rhythms of the alpha band and/or other EEG rhythms. An ear lobe electrode provides a reference. The electrode signals are fed to a channel differential amplifier which amplifies the difference between the 64 channels and the reference electrode. The signals are digitized and spatially filtered. The resulting signals are submitted to a frequency analysis periodically. The powers n specific frequency bands of specific signals are the independent variables for equations used to control cursor movement. Each variable consists of the amplitude at a specific frequency in a specific signal. Two control channels are provided: one for horizontal movement, and the other for vertical movement. Each control channel is defined by a linear or other equation. The intercept of each equation is based on an average of values of the independent variables that have been stored or recorded from the previous performance of the individual. The cursor moves a plurality of times per second in accordance with the analysis scanning frequency. Movement of the cursor to different portions of the screen can control other processes and devices by invoking programmed commands displayed thereon.

21 Claims, 3 Drawing Sheets

COMMUNICATION METHOD AND SYSTEM USING BRAIN WAVES FOR MULTIDIMENSIONAL CONTROL

FIELD OF THE INVENTION

The present invention relates to a method and apparatus for communicating utilizing brain waves, and more particularly to the use of mu rhythms of the alpha band to control, in several dimensions simultaneously, a computer or other electrically-controlled device, and thereby provide a means by which individuals with severe motor and neurological impairments can communicate with their environment.

BACKGROUND OF THE INVENTION

Many individuals with multiple sclerosis, cerebral palsy, spinal cord injuries, and other degenerative conditions, are locked into a private world of silence and suffering. These individuals cannot effectively communicate with their environment due to the impairment of the neuronal pathways in the brain and spinal cord that control their bodily movements. For these individuals, life is very bleak indeed.

In the absence of a medical treatment to restore the damaged nervous system, three options exist for restoring function. A first option is to augment the capabilities of the remaining pathways. Muscles that remain under voluntary control can be substituted for paralyzed muscles. This substitution, however, is often awkward and limited. Some individuals with massive brainstem lesions can use eye movements to answer questions or even operate a word processing program. Severely dysarthric individuals have been taught to use hand movements to produce synthetic speech.

A second option is to detour around the points of damage. People with spinal cord transection can use the electromyographic activity (EMG) from muscles above the level of the lesion to control direct electrical stimulation of paralyzed muscles, and thereby produce useful movement. This technique has restored significant hand and forearm function to people with cervical cord lesions, and also may permit individuals with thoracic cord lesions to walk again.

A third option is to provide the brain with new channels by which control and communication can be established. This third option featuring new channels of communication is one that has not received a great amount of attention. There is art, however, that suggests that electroencephalographic (EEG) activity can provide new channels for communicating.

The EEG reflects activity in the underlying brain. Thus, in theory, the intentions of the individual might be detected in the EEG. Unfortunately, this is not easily accomplished in practice. The resolution and reliability of the information detectable in the spontaneous EEG is severely limited by the vast number of electrically active neuronal elements; the complexity of the brain and head geometry; and the variability of brain operations.

In the sixty-six years since the first description of scalp-recorded EEG, many investigators have attempted to demonstrate human abilities to control a variety of EEG phenomena and use them for therapeutic purposes. The literature reports successful conditioning of the visual alpha rhythm, slow potentials, and the mu rhythm. For example, research has sought to increase specific EEG components and thereby reduce seizure frequency.

Few investigators have studied rapid bidirectional control, i.e., the ability to increase and decrease a component rapidly, which is essential for communication. Most important, no one has demonstrated such control in more than one dimension simultaneously. For example, no one has developed a method that uses the EEG to control both vertical and horizontal positions on a visual display simultaneously.

The alpha band is a frequency band of from 8 to 12 Hz in the scalp recorded EEG. The most prominent component of this band is the visual alpha rhythm. It is maximum over the occipital (i.e., visual) cortex in awake individuals with eyes closed. Eye opening will reduce, desynchronize, or block this rhythm.

Another component of the alpha band is the mu rhythm, which is 8 to 12 Hz activity over sensorimotor cortex. The mu rhythm is also known in the literature as "wicket", "comb", or "arceau" rhythm. The mu rhythm is most prominent in awake, relaxed individuals whose eyes are open. It is usually reduced or desynchronized by contralateral movements. It is believed to be an idling rhythm of the sensorimotor cortex, in contrast to the visual alpha rhythm, which is an idling rhythm of the visual cortex. It is probably the analog of the 12 to 16 Hz sensorimotor rhythm found in cats.

Only recently has the mu rhythm been shown to be present in most individuals. The recent studies have also shown the mu rhythm to contain a number of different components. The different components all share the same frequency band, posterior frontal/anterior parietal location, and attenuation with movement. However, these components differ in exact frequency, precise localization, and/or exact relation to movement. It is these differences that have led scientists to define them as different components. For example, one mu rhythm component might have a frequency of 11 Hz, be sharply focused over sensorimotor cortex on one side, and decrease appreciably before movement, while another mu rhythm component might have a frequency of 9 Hz, be diffusely localized over the midline, and decrease somewhat later. The new findings suggest that mu rhythms are ubiquitous and complex. It has also been demonstrated that individuals can increase mu rhythm amplitudes with the proper conditioning. This control is separate from the rhythm's normal responsiveness to contralateral movement.

The present invention teaches that mu rhythms can be used as a new EEG-based, brain-computer interface.

The current invention has provided a means by which humans can precisely and quickly increase and decrease rhythm components. Furthermore, this rapid bidirectional (i.e., increase/decrease) control can be achieved over more than one component at the same time. That is, it can be multidimensional. The result is that one component can be used to control horizontal movement while another is being used to control vertical movement. Such an interface could be of great value to those severely impaired individuals suffering from motor impairments due to brainstem stroke, cervical spinal cord injury, severe cerebral palsy, amyotrophic lateral sclerosis (ALS, or Lou Gehrig's disease), etc.

The most severely impaired individuals are presently confined in their communications to very limited systems comprising eye blinks, eye movements, or breathing changes. Even these limited movements may be impaired so that some individuals are without communication. They are literally "locked in" their bodies.

The present inventors recognize that, in order to provide such severely incapacitated individuals with a means of communicating with the outside world, it is necessary to provide them with a means that is equivalent to that of working a computer mouse or joystick.

The current invention also contemplates that the use of multidimensional EEG-based communication can be a more effective communication tool for less severely impaired individuals, whose movements, while adequate to provide communication, are difficult or tiring.

DISCUSSION OF RELATED ART

In U.S. Pat. No. 4,800,893, issued to ROSS et al. on Jan. 31, 1989, for Kinesthetic Physical Movement Feedback Display for Controlling The Nervous System of a Living Organism, a method and system is illustrated wherein an individual watches a display controlled by an EEG output. The method suggested by the feedback system is that an individual increases the amplitude of the sensory motor rhythm which is then used to control a response on a video screen. The visualization of that response is used in turn to form desired brain patterns in the individual. Unlike the present invention, this system does not provide communication or device control. Nor does it give several channels of EEG control that can be used to provide multidimensional (i.e., up/down, right/left) control. The multichannel control interface is similar to the workings of a computer mouse. As such, the present invention provides a brain-computer interface that is powerful enough to provide a communication methodology for even the most severely handicapped.

In U.S. Pat. No. 4,158,196, issued to CRAWFORD, JR., on Jan. 12, 1979, for Man-Machine Interface System, an electrical interface is shown wherein the human nervous system can be used to control a device such as a motorized wheel chair. The bioelectrical input is obtained from the muscles or peripheral nerves of the individual. Thus, it is electromyographic (EMG) or peripheral nerve activity, not electroencephalographic (EEG) activity. Therefore, individuals who are totally paralyzed by brain or spinal cord could not use it. By contrast, the current invention utilizes brain waves, such as mu rhythms. These rhythms are obtained from the somatosensory cortex.

SUMMARY OF THE INVENTION

In accordance with the present invention, there is provided a system and method of utilizing brain waves to communicate with the environment. The brain waves are processed online to control two-dimensional movement of a cursor shown upon a display. It is also contemplated that the brain waves, mu rhythm waves as well as other EEG components, can control other devices, as well as communicate with the environment. The individual whose mu rhythms are being detected, amplified and processed sits facing a device, which might produce video and/or other sensory feedback, such as a video screen. The scalp of the individual has electrodes placed in up to 64 locations, for monitoring EEG activity. An ear lobe electrode provides a reference. The electrode signals are fed to a 64-channel differential amplifier which amplifies the voltage differences between the 64 channels and the reference electrode. The resulting signals are then digitized and spatially filtered. The signals are processed and analyzed periodically (usually 8 times per second). The analysis provides values of independent variables for equations used to control cursor movement. Each variable consists of the amplitude at a specific frequency in a specific signal. Two information channels are provided: one for horizontal movement, and the other for vertical movement. Each information channel is defined by an equation. The intercept of each equation is based on an average of values of the independent variables that have been stored or recorded from the previous performance of the individual. The cursor moves a plurality of times per second in accordance with the frequency of analysis. Movement of the cursor to different portions of the screen can control other processes and devices by invoking programmed commands displayed thereon. For example, when the cursor reaches a given command box on the screen, the computer can turn on the lights in a hospital room. After a brief pause, the communication process can then start the next operational cycle, wherein further commands may be invoked.

The monitored signals from the individual can be analyzed and used for device control in a variety of ways. Essentially the different components of the mu rhythms, or any other brain rhythms, can be spatially filtered, and their frequencies analyzed and amplified. Different individuals may have different degrees of control over different rhythm components, and these individual control characteristics can be utilized to more effectively control the computer cursor movement about the display. The stored data for each individual can be used to refine control for each new session. The values of the cursor control equations are periodically updated and optimized, and the individual quickly learns how to control the cursor movements. The online analysis of the signals is optimized, by both online and offline analysis, to provide for the efficient control of the cursor.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, digital signal processing technology, using readily available hardware and incorporating sophisticated and easily modified software, has the necessary flexibility for development and implementation of EEG-based communication. The communication system of this invention digitizes up to 64 EEG channels, performs fully programmable real-time topographical (i.e., spatial) and frequency analyses, uses the results to control a video display, continually adapts its analysis so as to convert the user's EEG control as efficiently as possible into display control, provides performance data online to the system operator, and stores all data for later offline analyses directed at optimizing the online operations.

Figure 1:
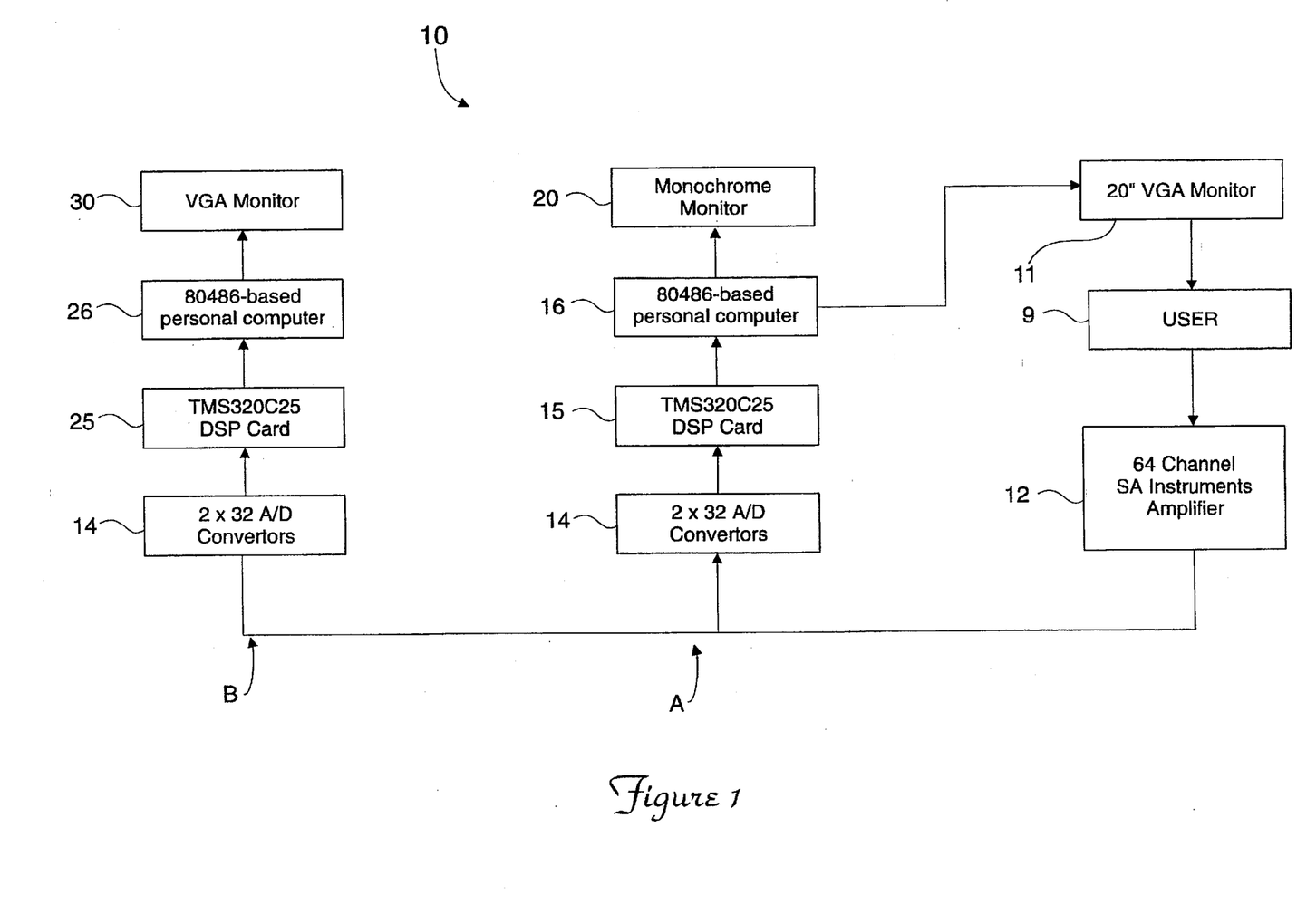
FIG. 1 illustrates a block diagram view of a typical analysis system of the invention, which utilizes brain waves to control cursor movement upon a display or monitor.

Now referring to FIG. 1, a diagram of the EEG processing system 10 of this invention is shown. As shown in FIG. 1, the user 9 sits facing a video monitor 11. Electrodes (not shown) are attached to the scalp of the user 9 in specified locations to obtain specific brain wave components. Explanation of the attachment of electrodes to the scalp at specific locations, to monitor different brain wave bands or components of bands is well known, and is not described for the purposes of brevity. EEG activity detected by the scalp electrodes is amplified by amplifier 12, and then digitized using Analog-to-digital (A/D) convertors 14. The signals at specific locations are spatially filtered, and their power in specific frequency bands is analyzed and translated into cursor movement on a screen or monitor 11 by means of a digital signal processing (DSP) card or board 15 and computer processor 16. The user 9 modulates these EEG components so as to move the cursor (not shown) toward commands located at the edge of the video screen 11. These commands control other machines or devices, such as the lights in a room, the level of a motorized hospital bed, etc. The system 10 uses cursor movement as its output, because it is objective, readily implemented, and serves as a prototype for a wide variety of devices (e.g., mouse driven programs, motorized wheelchairs, speech synthesizers and environmental control systems) that could be placed under EEG control. A monochrome monitor 20 provides information on system performance to the operator, not shown. The operator may use this data to adjust parameters for future sessions.

Early in user training for two-dimensional cursor movement, the selectable commands (not shown), are quite large, each occupying up to 40% of the periphery of the screen. As control develops, command size is gradually reduced to 25%, so that the targets do not overlap.

The hardware that supports cursor control consists of a 64-channel EEG amplifier 12 (SA Instruments), two 32-channel analog input boards (Spectrum Inc.), a TMS320C30-based digital signal processing (DSP) board 15 (Spectrum Inc.), and an IBM compatible PC/80486 computer processor 16, equipped with dual monitors 11 and 20, respectively. While only a small number of these 64 channels actually contribute to cursor control, all 64 are stored for later analysis and their presence allows adaptation to the unique topographical features of each user's EEG. Thus, in practice, only a small number of EEG channels are actually necessary to operate the system for any one user. Each 32-channel analog input board, has 32 input buffer amplifiers that feed into a 4-channel sample-and-hold multiplexer (not shown). This permits the simultaneous acquisition of a bank of 4 software-selectable channels. A 12-bit A/D converter 14 samples the 4 equal phase signals.

Each board can sample a single signal at 230 kHz, 4 signals at 58 kHz/channel and 32 signals at 7 kHz/channel. The two A/D boards 14 are connected to the DSP board 15 by Spectrum's DSP-LINK interface, which allows direct interrupt-driven data acquisition from up to 64 channels. The result of this design is that the Processor 16 is not involved in the initial data acquisition.

The DSP board 15 uses a TMS320C30 floating-point microprocessor. Digital signal processors have instruction sets optimized for the extensive multiply and accumulate operations typical of signal processing algorithms. The TMS320 instruction set includes arithmetic instructions that perform these operations in a minimal number of clock cycles. Floating point DSP processors are better suited for signal processing, because they do not require specialized algorithms such as integer-fast Fourier transform (FFT) routines. Furthermore, they support newer spectral analysis techniques, such as the autoregressive method.

The DSP board 15, has 64K of 32-bit memory and is programmable with a TMS320 C compiler (not shown). This feature allows use of standard code for FFT and autoregressive frequency analysis routines[1,2] (e.g., Press et al., 1988). In addition, Spectrum commercially provides a C-based library of interface routines for DSP-PC communication. The system 10 uses interrupt-driven communication so that the processor 16 is automatically provided with analyzed EEG data at regular intervals.

The processor 16 is provided with a monochrome monitor 20 for an operator (not shown) monitoring the user 9, and a VGA color monitor 11 for the user 9. This is one of the several possible computer video combinations[3] (Wilton, 1987). In other respects, the processing system is typical.

Two processing units A (online) and B (offline) are provided, as shown in FIG. 1, as will be explained hereinafter.

The online system (Unit A) has two processors, one on the processing board 15, and the other processor 16, respectively. Each executes two processes, giving a total of four processes. This parallel processing approach has several distinct advantages over the use of a single process. Several procedures must be performed in real time: moving data from the A/D convertor to memory, performing topographical and spectral analysis, translating the results into cursor movement, controlling the video displays, and storing summary data to disk. Since the processing requirements of these individual procedures are relatively independent except for the final results, the parallel design simplifies the program flow. Furthermore, each processor deals with those processing requirements for which it is best suited. The TMS320C30 processor on card 15 performs high-speed interrupt-driven data acquisition and signal processing, while the PC processor 16 handles the multiple input/output problems. The multiple channels also allows for separate X and Y control, i.e. there are separate channels for horizontal and vertical cursor movement.

In Unit B, the offline system, a second PC/80486 computer 26, equipped with two 32-channel analogue input boards 14, a TMS320C25-based DSP board 25 (both from Spectrum), and a monitor 30 is used to record all 64 ear-referenced EEG channels along with a variable indicating concurrent system state (e.g., pre-cycle pause, cursor movement, etc.). This variable is transferred via a serial port from the first (i.e., on-line) computer 16. Like the on-line hardware described above, the DSP and computer processors of this data collection unit are programmed in a foreground-background configuration. The DSP samples up to 64 channels of EEG data and passes this to the computer. The computer displays up to 16 selectable EEG waveforms simultaneously on a monitor 30. All 64 channels of EEG data are stored in extended memory until the end of each 2–3 minute operation run, at which time they are transferred to a hard disk for later comprehensive topographical and frequency analysis to define modifications to optimize the online algorithm.

This Unit B data allow comprehensive off-line analyses. The analyses have three objectives:

1) to reveal the major features of the EEG control developed by the user,
2) to detect the interference of non-EEG artifacts, and
3) to define better methods for controlling cursor movement on-line and thereby improving performance of the online system.

Software Operations

The software routines are illustrated in source code in Appendix A, attached hereto for further edification.

Both the Texas Instruments TMS320C30 card 15 processor and the Intel 80486 processor 16 are programmed to run in a foreground/background configuration, as aforementioned. Thus, these two processors run four processes in parallel. All of the software is written in the C programming language.

Generally, DSP processors are programmed either in C or in their native, highly specialized, assembly languages. Use of the C language with both processors allows routines for signal processing to be tested on the processor 16, prior to use on the DSP board 15. In addition, software can easily be transferred to alternative DSP processors. For example, TMS320C25 and TMS320C30 microprocessing boards 25 and 15 may both be used, even though they have very different assembly languages. Finally, the use of C for both the DSP processing and the PC processing creates consistency across software modules.

The background routine on the DSP board 15 is initiated by an interrupt request generated by one of the two 32-channel analogue input boards at the end of a conversion. This process acquires the data. When a data buffer (not shown) is full, the DSP background process sets a flag to signal the DSP foreground routine and increments a counter (not shown) to shift to the next data buffer.

The foreground process on the DSP board 15 monitors the status of a flag set by the background process. When the flag indicates that a data buffer is full, the foreground process performs a topographical (i.e., spatial) and frequency analysis on the data. When this analysis is completed, the results are moved to dual-ported memory (not shown), and an interrupt to the processor 16 is generated.

The background process on the processor 16 is initiated by the interrupt request from the DSP board 15. This process acquires EEG data from the DSP board, converts them into cursor movement commands, and controls the display on the user's monitor 11. It does not use system BIOS calls (including those not immediately apparent to the programmer, such as the print function in the standard C library), because the interrupt can occur at any point in the foreground program. Since the foreground process uses BIOS routines, a BIOS call in the background process could call the same BIOS routine that was interrupted, and might thereby cause the system to crash. Thus, all functions normally handled by the BIOS are handled by the processor 26 background process with customized routines. For example, the computer background process handles the VGA video 30 graphics with code patterned after that in Wilton[3] (1987).

The computer background process controls the cursor operation. The selectable commands (not shown) appear at the corners of the screen. After a brief delay (e.g., 1-sec), the cursor appears in the center of the screen and starts to move (e.g., 8 times/sec). It continues to move until it reaches a point on the edge of the screen. The command at that point is selected (e.g., turn TV on, turn lights off). Then the screen becomes blank for a short (e.g., 1-second) inter-cycle interval, and then the next cycle begins. A single variable has a unique value for each of these screen states. This variable keeps track of the sequence of events controlled by the computer background process, and thus allows this process to be initiated at the same point following each DSP-initiated interrupt request. It is also used to index all data stored for later offline analysis, thereby insuring accurate matching between data and system state.

The foreground process on the PC computer provides control parameters for the display on the user's monitor 11, and for the conversion of the user's EEG data into cursor movement. It also records data to disk, and displays information concerning system operation and user performance on the operator's monitor 20. All communication between the foreground and background processes occurs through global variables that are operated on by both processes. This allows transfer of control parameters and task-related data.

The timing of all four processes is controlled by a 8-MHz clock (not shown) on one of the 32-channel analogue input boards. This clock controls the data sampling rate and hence the rate at which the DSP background process is initiated by the interrupt request generated at the end of an A/D conversion. The foreground process initiates the selected topographical and frequency analysis algorithm when a data buffer becomes full, which occurs at a fixed multiple of the sample time. The computer background process is initiated by the interrupt request generated by the DSP board 15 at the end of the topographical and frequency analysis. Thus, the update rates for the user's and operator's displays 11 and 20, respectively, are controlled by the rate at which the DSP background process analyzes each data block.

EEG activity is recorded with standard scalp electrodes mounted in a cloth cap. Signals from 64 channels, all referred to a right-ear reference electrode, are amplified (20,000×, bandpass 1–70 Hz) and digitized. The DSP board spatially filters the data by re-referencing each channel in a fully programmable fashion. Currently, the common average reference is calculated[4] (Pfurtscheller, 1988). Other alternatives can include Laplacian derivations. The board then performs a fully programmable frequency analysis and makes the results available to the PC computer.

The preferred embodiment of the invention uses the maximum entropy method of frequency analysis (MEM)[1] (Marple, 1987), which has distinct advantages for an on-line analysis, as taught herein. The MEM algorithm supports higher resolution frequency analysis of shorter time segments.

Computer calculation of cursor movement

At fixed intervals, e.g., 125 msec, the computer uses the power at specific frequencies in specific EEG signals to control cursor movement. The selection of frequencies and signals is fully programmable. The invention focuses on components of the mu rhythm, which is 8–12 Hz activity recorded over sensorimotor cortex, although other rhythms and their components are contemplated for use in this inventive methodology. The functions that convert these measures into cursor movement are also programmable. The present system uses linear functions.

The simplest case is one-dimensional cursor movement, i.e., vertical movement to commands located at the top or bottom edge of a screen.

Assuming $\Delta V$ is vertical cursor movement, "S" is the voltage at a specific scalp location and frequency, "a" is the gain, and "b" is the mean voltage for the user's previous performance, then the vertical cursor movement $\Delta V$ is given by:

$$\Delta V = a(S+b)$$

Since "b" is defined by the user's previous performance, if performance remains constant the net cursor movement over an extended period will be 0 and top and bottom commands will be equally accessible. The computer recalculates "b" at the end of each 2–3 minute series of cycles. The value of "a" determines the rate at which the cursor moves across the screen. Generally, "a" is increased as a user's control improves. The system can also be programmed to modify "a" periodically so as to achieve a specific average cycle duration (e.g., 1.5 sec).

In the two-dimensional case, one linear function controls horizontal cursor movement and another controls vertical movement. For example, the first successful two-dimensional algorithm used the sum of the mu rhythm voltages over left and right sensorimotor cortices (S1 and S2) to control horizontal movement and their difference to control vertical movement[5] (Wolpaw and McFarland, 1994).

If $\Delta V$ is vertical cursor movement and $\Delta H$ is horizontal cursor movement, then:

$$\Delta V = a_v[(S_1+S_2)+b_v]$$

and $$\Delta H = a_H[(S_1-S_2)+b_H]$$

are the functions that determine cursor movement. Ideally, the values obtained for $\Delta V$ and $\Delta H$ are orthogonal.

Proper selection of the intercepts ($b_v$ and $b_H$) and gains ($a_v$ and $a_H$) is essential if the user is to be able to access the desired commands reliably. For the intercepts, the mean of the EEG voltages over a substantial number of cycles is a logical choice, since, as indicated above, it renders top and bottom (and right and left) commands equally accessible. The intercept is the mean voltage for the most recent 2–3 minute of operation averaged with the previous value. This recursive computation dampens variations over time.

Selection of the gains, $a_v$ and $a_H$, is a more complex problem. The program uses an algorithm that adjusts the gains so that the average cycle duration approaches a chosen value. For example, if the desired average cycle duration is 1.6 seconds and the average duration for the most recent 2–3 minute series was 2 seconds, the gains are each increased by 25%.

As user control improves, the selected cycle duration is decreased. This algorithm also maintains a constant relationship between $\Delta V$ and $\Delta H$, so that vertical and horizontal movements are commensurate with the dimensions of the screen.

As noted above, the key features of each cycle, including the data necessary for the computation of control parameters, are recorded by the computer background process, while the user is moving the cursor. The computation of control parameters (e.g., $a_v$, $a_H$, $b_v$, $b_H$), is performed by the computer foreground process during the rest period between sets of cycles when the user's screen is blank and the interrupt which initiates the background process is disabled. The computer background process stores data in buffers as the online session progresses, and the foreground process monitors these buffers and transfers data to disk at appropriate intervals. Three data files are produced. One contains the parameters that control trial timing, translation of EEG into cursor movement, frequency of movement, and command size, as well as the commands hit and missed. A second file contains for each command location the EEG frequency spectra for the channels used for cursor control, averaged over each run. A third file contains for each interrupt-driven interval the voltages for each of the frequency bins used to control cursor movement. This data storage is separate from the complete data storage performed by Unit B as described above.

Description of EEG control

In summary, device control (e.g., cursor movement) according to the user's wishes, is achieved through the interaction of two adaptive controllers. The first adaptive controller is the user, who learns to control specific EEG components (i.e., power in specific frequency bands at specific scalp locations). The second adaptive controller is the system described herein, which detects the user's EEG control and translates it as efficiently as possible into device control.

Detection and elimination of non-EEG artifacts

The system 10 must be able to ensure that the electrical activity recorded from the scalp and used for communication is actually EEG. A variety of non-EEG phenomena, including electromyographic (EMG) activity from head and neck muscles, potentials generated by eye movements or blinks, and head movement artifacts can contribute to the electrical activity recorded from the scalp and can masquerade as EEG. These contaminants can normally be distinguished from EEG by their frequency characteristics and/or topographical distributions. True mu rhythm control, for example, is confined to a narrow band near 10 Hz and focused over sensorimotor cortex. In contrast, EMG activity is very broad-banded, increases with frequency to a maximum above 100 Hz, and tends to be located near the periphery of the scalp; while eyeblink artifact is mainly low in frequency (i.e., 1–5 Hz) and is concentrated near the forehead. The complete EEG data and fully programmable capacity for topographical and frequency analysis provided by the inventive DSP-based system 10 permits us to detect such artifacts and to prevent them from interfering with performance online.

The inventive DSP-based system 10 has the capacity to prevent non-EEG artifacts from contributing to cursor movement and thereby interfering with on-line performance. In the simplest form of artifact detection and rejection, maximum allowable voltages can be specified for specific frequency bands at specific locations (e.g., 5-Hz band in frontal electrodes, to detect eye blinking). The system can also incorporate in the on-line algorithm a subroutine that uses location-specific templates of common artifacts to detect them and to remove them from the EEG signal.

Modification of the online algorithm

The comprehensive topographical and frequency analysis supported by this DSP-based system allows off-line evaluation of alternative algorithms for translating EEG control into rapid and accurate cursor movement. It is able to detect and measure control at locations and frequencies other than those that were used to control the cursor online. These alternatives can then be tested online to determine whether they support improved control. For example, analysis of EEG stored while users were controlling two-dimensional cursor movement with the sum and difference of mu rhythm amplitudes over sensorimotor cortex[5] (i.e., the original two-dimensional control algorithm (Wolpaw and McFarland, 1994)) showed that 12–15 Hz activity over occipital scalp areas was correlated with right/left target location and led us to incorporate these occipital components into the online algorithm.

Furthermore, the high adaptability of the DSP-based system facilitates exploration of a wide variety of modifications. Changes in cursor movement rate and gain, command number, appearance and size (i.e., portion of screen periphery occupied), cycle timing, EEG reference, spatial filtering frequency analysis method and band width, the equations that translate EEG into cursor movement, and other online parameters are easily implemented and tested.

Finally, while the output of the BCI system is currently limited to cursor movement, the flexibility of this fully programmable system would allow substitution of a variety of other outputs, including commercially available mouse-driven programs, row-column scanning devices, and other standard control interfaces.

Development and implementation of EEG-based brain-computer communication requires a system that is highly flexible and capable of rapid and complex real-time processing. The analogue methodologies frequently used in EEG research and applications are not readily able to satisfy these requirements. The DSP-based system 10 described herein has the requisite processing capacity and flexibility. It provides fully programmable high speed topographical and frequency processing, derivation of control signals, control of the output device, and storage of all EEG data and control parameters. These capabilities support implementation and evaluation of alternative analysis algorithms, detection and evaluation of alternative control signals, detection and elimination of non-EEG artifacts, and comprehensive analysis of the characteristics of EEG control. Furthermore, the system can easily incorporate higher capacity hardware components and additional software modules as they become available.

Figure 2:
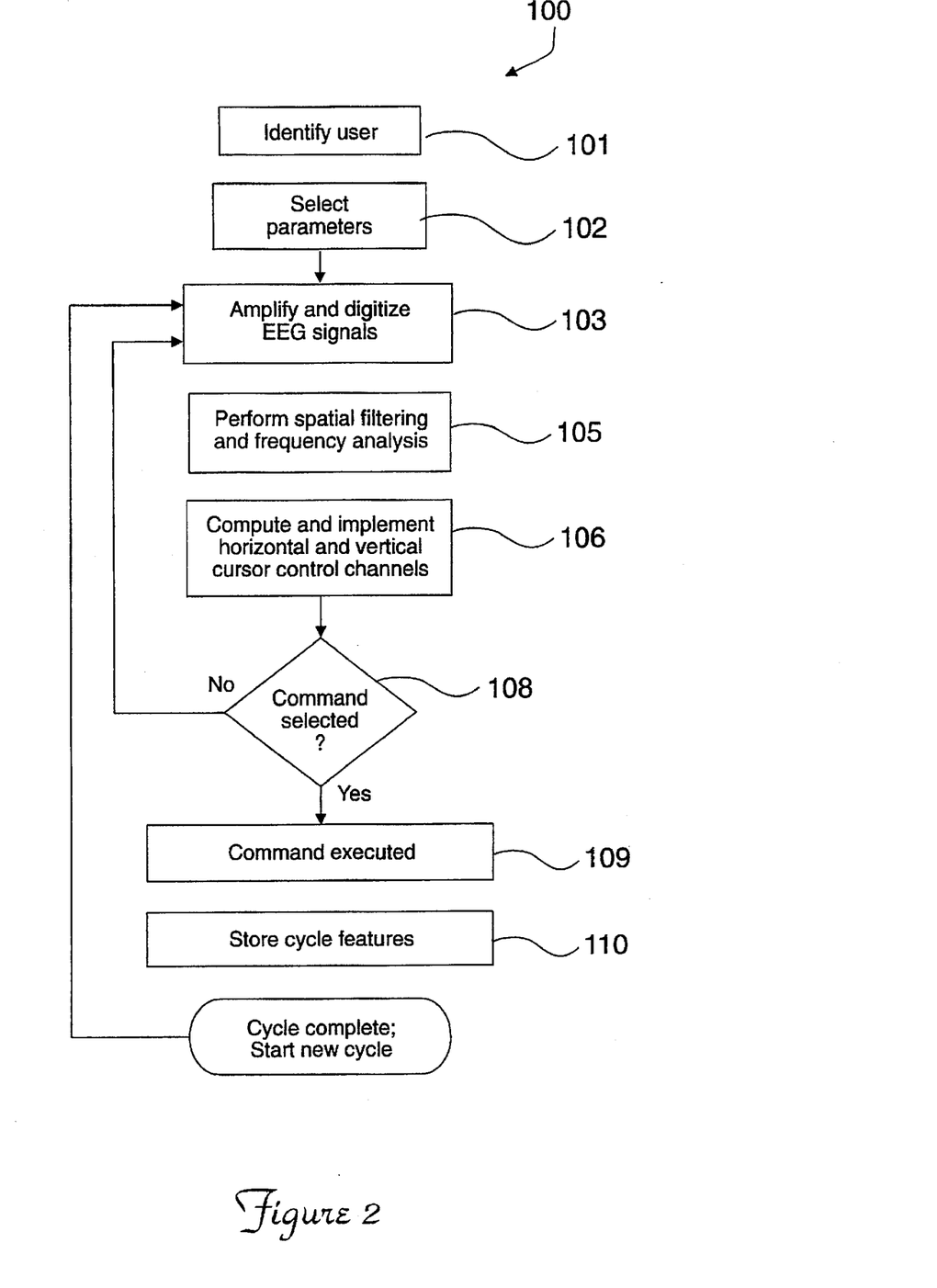
FIG. 2 depicts a flow chart diagrammatic view of the online processing of brain waves in accordance with the method of this invention.
Figure 3:
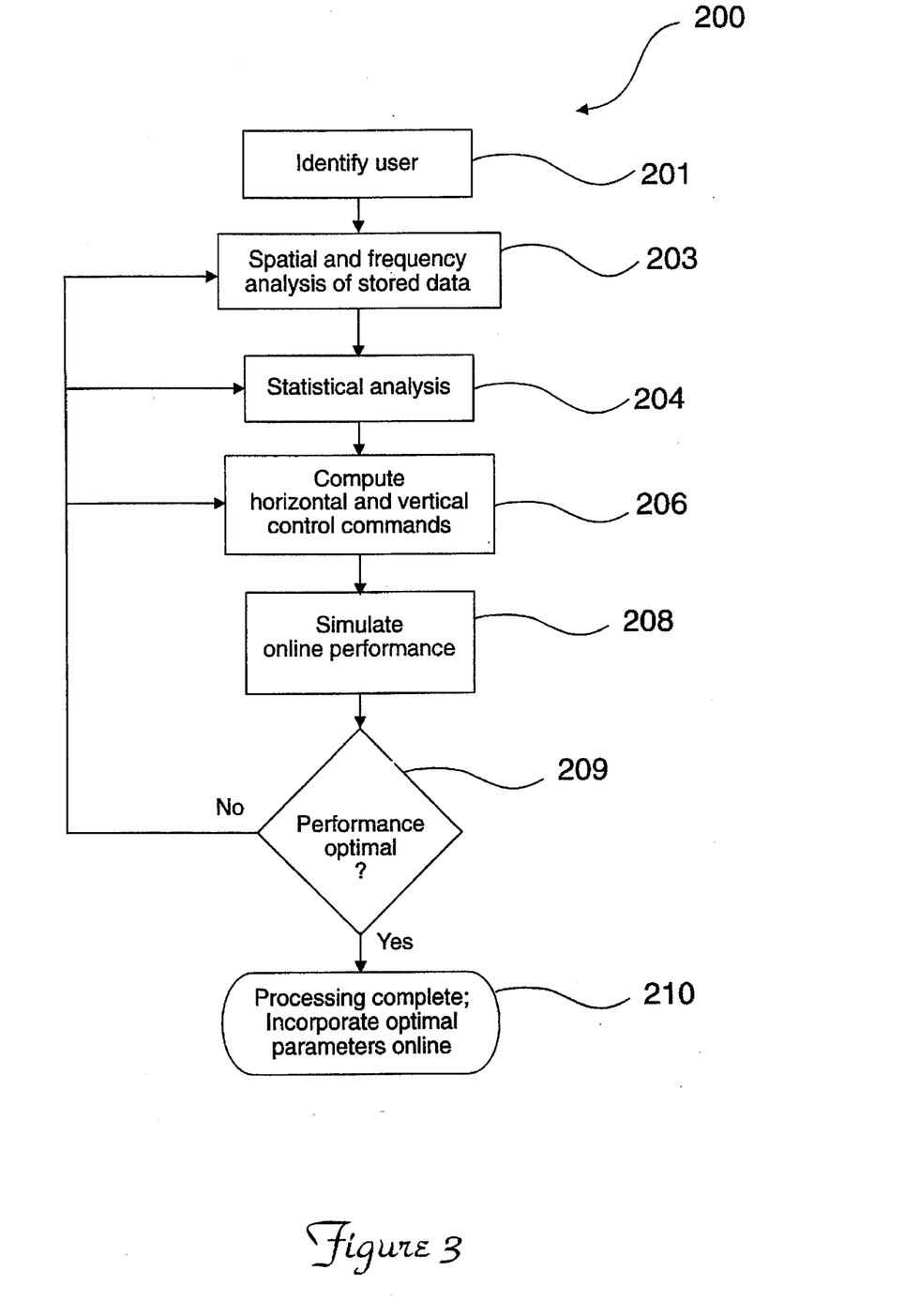
FIG. 3 shows a flow chart diagrammatic view of the offline processing of brain waves in accordance with the method of the invention.

Referring to FIGS. 2 and 3, the methodology of optimizing the control capabilities of the EEG data monitored from the user is accomplished both online, and offline, respectively, by flowcharts 100 and 200, respectively. It should be understood that the results of the comprehensive offline analyses performed in flowchart 200 are periodically used to optimize the online operations outlined in flowchart 100.

In FIG. 2, the user is first identified, block 101. The online parameters of Unit A, used for cursor control, block 102, are selected and may be periodically modified by information gleaned from the data obtained in Unit B, flowchart 200. These two blocks 101 and 102 initialize the system; blocks beginning at reference numeral 103 represent online operation. EEG signals from the selected electrode locations are amplified and digitized, block 103. Next, the signals are spatially filtered, via a selected algorithm (e.g., common average reference, Laplacian) and then submitted to frequency analysis (e.g., FFT, MEM), block 105. Powers in specific frequency bands in specific EEG signals are then used as the independent variables in two equations: one determining horizontal cursor movement and the other determining vertical cursor movement, block 106. In addition, at this point non-EEG artifacts are detected and prevented from affecting cursor movement. If the cursor movement does not select a command, block 108, processing continues from block 103. The system reaches this decision point about eight times per second. If the cursor movement does select a command, block 108, the command is executed, block 109 (e.g., room lights are turned on, the word "yes" is spoken by a voice synthesizer, etc.). Cycle features (e.g., duration, cursor movements, command selected) are then stored, block 110. Periodically (every 2 or 3 minutes) online parameters (e.g., constants in equations controlling cursor movement) are automatically modified to optimize system performance.

In flow chart 200, the user is identified, block 201. The stored data is analyzed, block 203. This includes a selected spatial filtering and selected spectral analysis. A selected statistical analysis (e.g., discriminant analysis, logistic regression) is then performed, block 204, to determine those EEG variables (i.e., amplitudes at specific frequencies at specific locations) that are correlated with horizontal or vertical position of the desired command. The identified EEG variables are then used in specific equations controlling horizontal and vertical cursor movements, block 206. Online performance is then simulated, block 208. It should be noted that the data submitted to these offline analyses typically are generated by standard calibration sessions during which the user attempts to communicate a predetermined set of commands. These calibration sessions are conducted periodically for each user.

If performance has not been optimized or substantially improved, block 209, the operations in blocks 203, 204 and/or 206 are modified. However, if performance is optimized or substantially improved, block 209, the selected parameters (e.g., spatial filter, frequency analysis, EEG variables, horizontal and vertical control equations) are incorporated into the online operation in flow chart 100.

BIBLIOGRAPHY

1) Marple, S. L. 1987. Digital spectral analysis with applications. Englewood, N.J.: Prentice-Hall
2) Press, W. H., Flannery, B. P., Teukolsky, S. A. and Vetterling, W. T. 1988. Numerical recipes in C: The art of scientific computing. New York: Cambridge University Press.
3) Wilton, R. 1987. Programmers guide to PC and PS/2 Video Systems. Redmond, Washington: Microsoft Press.
4) Pfurtscheller, G. 1988. Mapping of event-related desynchronization and type of derivation, Electroencephalography and clinical Neurophysiology [Suppl] 70: 190–193.
5) Wolpaw, J. R. and McFarland, D. J. 1994. Multichannel EEG-based brain-computer communication, Electroencephalography and clinical Neurophysiology 90: 444–449.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of exercising control of an object shown upon a display by brain wave monitoring, wherein a brain of an individual being monitored responds to command selections that are shown upon said display, and thereby moves the object shown upon the display to a selection desired by the individual, said method comprising the steps of:

a) monitoring said brain waves of an individual; and
   b) computer processing the monitored brain waves in accordance with step (a) in order to control said object shown upon said display, and further including the steps of:
       i) monitoring said brain waves at a comprehensive set of head locations;
       ii) selecting specific head locations to be utilized to control said object;
       iii) feeding said brain waves from said selected head locations to a computer which utilizes temporal and spatial filtering methods to obtain a plurality of object control signals;
       vi) using an algorithm to combine said plurality of object control signals to control movement of said object upon said display;
       v) storing data consisting of brain waves from all of said monitored head locations, said control signals derived from the selected head locations, and movements of said object; and
       vi) periodically analyzing said stored data of step (v), using results of said analysis to modify said selection of specific head locations, said plurality of object control signals derived in step (iii) from said selected head locations, and said algorithm of step (iv), so as to improve control of object movement.

2. The method in accordance with claim 1, further comprising the step of:

c) utilizing said movement of said object shown upon said display to communicate with, or otherwise control a device disposed externally to said computer.

3. The method in accordance with claim 1, wherein the algorithm step (b) (vi) controls the bidirectional movement of said object in at least two dimensions.

4. A method of using brain waves for real time, bidirectional control of a cursor upon a display, in conjunction with stored information, said bidirectional control of said cursor being exhibited along at least two dimensions of said display, and said stored information being used to modify the real time, bidirectional control of said cursor, said method comprising the steps of:

a) selecting head locations on an individual, and detecting and monitoring brain waves of said individual from said select head locations;

b) processing said detected and monitored brain waves from said select head locations of step (a), to obtain object control signals, and using said object control signals in an algorithm, to bidirectionally control movement of a cursor shown upon a display, along at least two dimensions thereof;

c) storing information with respect to the monitored brain waves, derived object control signals, and said algorithm for control of movement of said cursor upon said display in accordance with step (b); and d) using the information stored in step (c), to modify said selected head locations from step (b), and thereby improve bidirectional control of said cursor movement upon said display in real time.

5. A system of communicating with, or otherwise controlling, a device by using brain waves of an individual, comprising:

monitoring means for detecting and monitoring brain waves of an individual in real time at select head locations;

command selection and feedback means positioned adjacent said individual and operatively connected to said monitoring means, for displaying movement of an object;

an online unit connected to said command selection and feedback means and said monitoring means, for processing and controlling movement of said object displayed by said command selection and feedback means, in response to said real time monitoring of brain waves of said individual by said monitoring means; and an offline unit connected to said monitoring means for storing and analyzing information with respect to control of said object, said offline unit using said stored information for analysis that results in modifying brain wave control of said object in real time, to thereby optimize real time control of movement of said object by said online unit.

6. The system of communication in accordance with claim 5, further comprising analog-to-digital conversion means connected to said monitoring means and said respective online and offline units, for transforming the detected and monitored brain waves into digital signals.

7. A method of monitoring brain waves of an individual, and displaying movement of an object upon a display in response thereto, and permitting said individual to consciously control said movement with a computer processing the monitored brain waves in order to control said object, including the steps of:

a) choosing select head locations to monitor brain waves;

b) monitoring said select head locations to obtain brain waves;

c) feeding said brain waves to a computer, which uses temporal and spatial filtering routines to eliminate non-EEG artifacts and isolate a plurality of object control signals;

d) combining said plurality of object control signals of step (c) using an algorithm to control movement of said object upon a display in several dimensions; and e) providing a database consisting of said brain waves, said object control signals and said algorithm to improve control of movement of said object.

8. The method in accordance with claim 7, further comprising the step of:

f) modifying the combining step (d) substantially periodically in real time, in order to enhance control of said object, said control being enhanced by analysis of said stored database of step (e).

9. The method in accordance with claim 7, further comprising the step of:

f) modifying the combining step (d) in real time, in order to enhance control of said object, said control being enhanced through analysis of said stored database of step (e).

10. The method in accordance with claim 7, further comprising the step of:

f) modifying said selected head location choices in accordance with step (a) in real time, in order to enhance control of said object, said control being enhanced through analysis of said stored database of step (e).

11. The method in accordance with claim 7, further comprising the step of:

f) modifying the monitored head locations in accordance with step (b) in real time, in order to enhance control of said object, said control being enhanced through analysis of said stored database of step (e).

12. A system of communicating with, or otherwise controlling, a device by using brain waves of an individual, comprising:

monitoring means for detecting and monitoring said brain waves of an individual in real time at select head locations;

command selection and feedback means positioned adjacent said individual and operatively connected to said monitoring means, for displaying movement of an object;

a first control channel connected to said command selection and feedback means and said monitoring means, for processing and controlling movement of an object in a horizontal plane upon said command selection and feedback means, in response to real time monitoring of brain waves of said individual by said monitoring means; and a second control channel connected to said command selection and feedback means and said monitoring means, for processing and controlling movement of an object in a vertical plane upon said command selection and feedback means, in response to real time monitoring of brain waves of said individual by said monitoring means.

13. The system in accordance with claim 12, further comprising analog-to-digital conversion means connected to said monitoring means and said respective first and second channels, for transforming the detected and monitored brain waves into digital signals.

14. The system in accordance with claim 13, wherein said first and second control channels each further comprises digital processing means connected to said respective analog-to-digital conversion means for processing the digital signals.

15. A method of processing brain wave signals to control two-dimensional movement of a cursor upon a screen, comprising:

a) monitoring brain waves of an individual to obtain object control signals from select head locations of said individual;

b) directing said object control signals of the monitored brain waves of step (a) into a plurality of processing channels;

c) processing said object control signals in a first one of said plurality of processing channels to control movement of a cursor upon a screen in a first dimension; and d) simultaneously processing said object control signals in a second one of said plurality of processing channels to control movement of said cursor upon said screen in a second dimension.

16. The method in accordance with claim 15, wherein said processing step (c) includes the steps of:

e) selecting mu rhythm object control signals derived from mu rhythm components of brain waves; and f) processing said mu rhythm object control signals.

17. The method in accordance with claim 15, wherein said processing step (c) includes the steps of:

e) providing a database of stored brain wave information and object control signals, combined by an algorithm; and f) using said database of combined brain wave information and said object control signals, to improve object control.

18. The method in accordance with claim 15, wherein said processing step (d) includes the steps of:

selecting at least components of mu rhythms; and f) processing the mu rhythm components.

19. The method in accordance with claim 15, wherein said processing step (d) includes the steps of:

e) providing a database of stored brain wave information; and f) processing component brain wave information of said database to improve object control signals.

20. The method in accordance with claim 15, wherein said dimensions of cursor movement in respective steps (c) and (d) are horizontal and vertical, respectively.

21. A method of exercising control of an object shown upon a display by brain wave monitoring, wherein a brain of an individual being monitored responds to command selections that are shown upon said display, thereby moving the object shown upon the display to a selection desired by the individual, said method comprising the steps of:

a) monitoring said brain waves of an individual; and b) computer-processing the monitored brain waves in accordance with step (a), in order to control said object upon said display, and further including the steps of:

i) monitoring said brain waves at select head locations;

ii) selecting specific head locations to be utilized to control said object;

iii) feeding signals of said brain waves from selected head locations to a computer which utilizes temporal and spatial filtering routines to obtain a plurality of object control signals;

iv) using an algorithm to combine said plurality of object control signals to control movement of said object upon said display;

v) storing data consisting of said brain wave information from all if said monitored, selected head locations; said control signals derived from said selected head locations; and information of object movement; and vi) periodically analyzing said stored data of step (v), using results of said analysis to modify said algorithm of step (iv), so as to improve control of object movement.

* * * * *